Nov. 12, 1935.   C. P. CHAMBERLIN   2,020,993
METAL MOLDING AND FASTENING MEANS THEREFOR
Filed Nov. 10, 1933

INVENTOR
CLARENCE P. CHAMBERLIN.
BY
ATTORNEY

Patented Nov. 12, 1935

2,020,993

UNITED STATES PATENT OFFICE 2,020,993

METAL MOLDING AND FASTENING MEANS THEREFOR

Clarence P. Chamberlin, Detroit, Mich.

Application November 10, 1933, Serial No. 697,396

4 Claims. (Cl. 296—29)

This invention relates to metal molding and means for fastening the same to a base or plate, the object being to provide a molding having a base of any desired metal as iron or a soft steel and a comparatively thin covering of stainless steel or other material providing the desired appearance with the mold steel base having a projecting part insertable through openings provided in the plate to which it is to be secured and a retaining means on the under side of the plate cooperating with the said projecting part to prevent removal of the molding from the plate.

The invention is not confined to the character of the plate to which the molding is to be secured, it being usable in any character of installation where a metal molding is required and is particularly adaptable for use in conjunction with parts of an automobile body, as for instance a running board or the like, to which the molding is to be secured.

A further object of the invention is to provide a molding of the character of construction stated in which the base or mold steel portion has a struck out loop on its inner face that is insertable through preferably elongated rectangularly shaped openings in a plate or member to which the molding is to be secured and a fastening means therefor on the under side of the plate or member adapted to be inserted through the loop, the said fastening means being of a spring steel placed under tension by insertion through the loop to hold the molding tightly to engagement with the opposite face of the plate.

It is also a feature and object of the invention to provide a fastening means of spring metal somewhat arcuate in form and shaped to readily be inserted through the loop or projecting element of the molding member to be deflected by such insertion and having a central portion of less width than the end portions thereof providing notches on opposite sides of the fastening element in which portions of the loop lie and whereby the fastening means is held from displacement.

These and other objects and features of the invention are hereinafter more fully described and claimed, and the preferred form of construction of a molding and a fastening means therefor embodying my invention is shown in the accompanying drawing in which—

Figure 1:
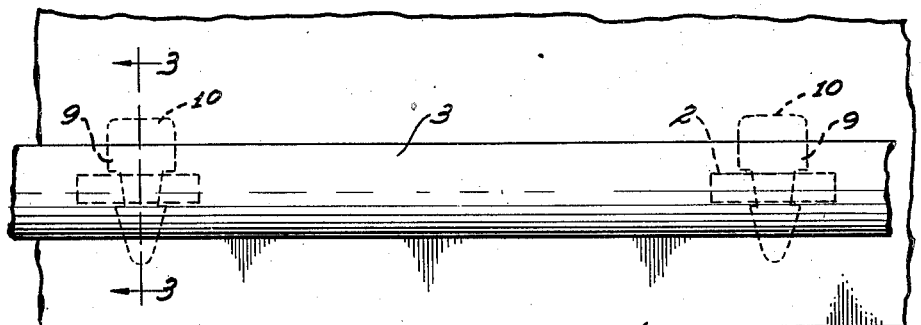
Fig. 1 is a plan view of the molding showing my improved means of fastening the same to a plate.
Figure 2:
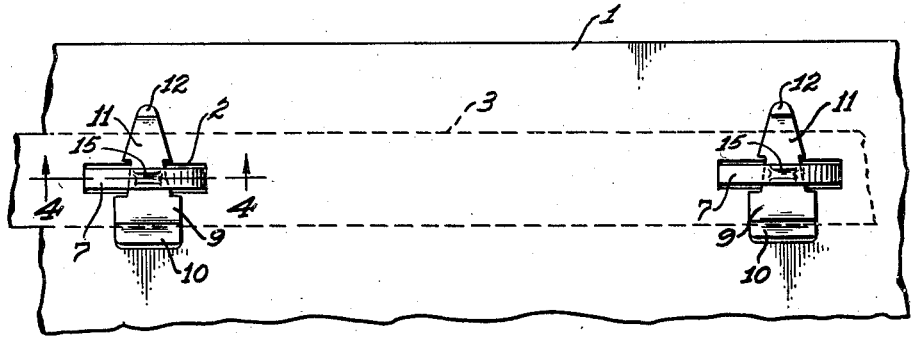
Fig. 2 is a plan view of the under side of the plate showing the fastening means in full lines.

As above stated, it is not material to this invention what the element to which the molding is to be secured may be and the word "plate", as hereinafter used, is intended to refer to any such element. As indicated in dotted lines 3 in Fig. 1 and full lines in Fig. 2, the plate is provided with a series of spaced apertures 2 preferably rectangular in form and elongated parallel with the longitudinal center line of the molding 3 to be attached thereto.

Figure 3:
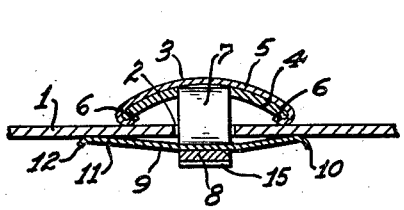
Fig. 3 is a cross section on an enlarged scale taken through the molding, plate and fastening means on line 3—3 of Fig. 1.
Figure 4:
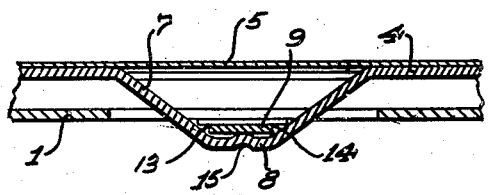
Fig. 4 is an enlarged section taken on line 4—4 of Fig. 2.

As shown in Figs. 3 and 4, the molding 3 is formed of two parts, a soft iron or mild steel base 4 and a comparatively thin outer cover 5 preferably formed of stainless steel and in the structure shown in Fig. 3, the molding is arcuate in form in cross section and also the outer shell or cover 5 is inturned as at 6 about the longitudinal edges of the member 4 so that when the molding is in place on the plate 1 only the polished stainless steel member 4 is visible. In constructing the molding 3 the base element 4 thereof has portions 7 struck inwardly in respect to the outer shell 5 forming what is herein termed loops and the apertures in the base 4 formed by the pressing out of these loop portions 7 are completely covered by the outer shell 5 so that the molding, when in place, has a uniform and unbroken appearance as will be understood from Fig. 1.

Figure 5:
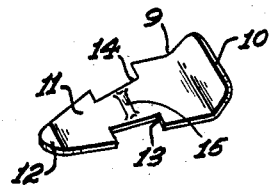
Fig. 5 is a perspective view of the preferred form of fastening means.

The loops are struck out a distance greater than the distance from the outer surface of the member 4 to the under side of the plate 1 and thus when the molding is positioned on the plate as shown in Figs. 3 and 4, the loops extend below this under surface and a lock element 9, preferably of the form shown more clearly in Fig. 5, is inserted between the terminal end 8 of the loop and the under surface of the plate 1. The lock element 9 is preferably of sheet spring steel, it having an upturned edge 10 at one end which end is of greater width than the end 11 which is the first to be inserted through the loop. The flange 10 provides means permitting pressure to be applied to the element 9 in forcing it to place. The element 9 is also bowed in form as will be realized from Figs. 4 and 5 and the inserted end 11 has a slightly upturned terminal 12 that enables the fastening clip to ride comparatively freely across the slot or opening 2 in forming the same to locking position. The central portion of the fastening clip is notched at 13 and 14 on opposite sides as clearly shown in Fig. 4. Thus, when the clip is in place, the edges 15 and 16 of the respective notches engage on opposite side edges of the loop 7 as will more clearly be understood from Fig. 3. As this lock element 9 is of spring steel and of bowed form, it is flattened considerably in inserting the same to the position shown in Figs. 3 or 4 and a tension is thus provided holding the molding in tight engagement with the surface of the plate or element on which it is mounted and the length of the loop member 7 and form of the clip are such as to produce the necessary tight engagement between the molding and plate.

Preferably the terminal end of the loop is indented as indicated at 15 providing a rib engaged by the loop element 9 as shown more clearly in Fig. 4.

In forming the molding, the base member 4 is first shaped to the desired form in cross section and the parts 7 herein termed "loops" are struck outwardly of the inner side of the member 4. The outer shell 5 (which may within the scope of this invention be made of any desired material) is preferably a thin sheet of stainless steel applied thereto and forced to close surface contact with the outer surface of the element 4 through the inturning of the edge portions 6 about the edges of the base 4, and it is then ready to be fastened to the member 1. While within the scope of this invention, the molding may have any desired form in cross section it is evident that for general purposes an arcuate form is satisfactory and is probably the least expensive form in which the structure can be made, there are, however, many cases where even a flat form is desired to conform to some general design of the structure with which it is to be associated and may also be otherwise shaped as to its exterior face within the scope of the invention as set forth in the appended claims.

Having thus briefly described my invention, its utility and mode of operation, what I claim and desire to secure by Letters Patent of the United States is—

1. A composite metal molding for fastening to an apertured plate comprising a sheet metal base member of bowed form in cross section, loops struck out from the body of the base member to project beyond the plane of the edges thereof, an imperforate cover member of sheet like material having the longitudinal edges thereof turned inwardly about the edges of the base member, the loops each being adapted for insertion in an aperture provided in the plate to below the surface thereof and unsupported thereby, and a spring clip for insertion through the loop to engage the plate under tension and hold the inturned edges of the cover member in contact with the plate.

2. A composite metal molding for fastening to an apertured plate comprising a sheet metal base member of bowed form in cross section, loops struck out from the body of the base member to project beyond the plane of the edges thereof, an imperforate cover member of sheet like material having the longitudinal edges thereof turned inwardly about the edges of the base member, the loops each being adapted for insertion in an aperture provided in the plate to below the surface thereof and unsupported thereby, and a fastening device for each of the loops consisting of a spring metal clip bowed in form from one end to the other and having notches in its opposite side edges between the said ends to engage the opposite sides of the loop to prevent displacement and holding the molding in place on the plate under tension.

3. A composite metal molding for fastening to an apertured plate comprising a sheet metal base member of the desired form in cross section with the edges thereof lying in a plane at one side of the body portion thereof, loops struck out from the body of the base member to project beyond the plane of the said edges thereof, an imperforate cover member of sheet metal of the desired character secured to the base member by inturning the longitudinal edges of the cover member about and inwardly of the edges of the base member, the loops each being adapted for insertion in an aperture provided in the plate, the plate apertures being of greater width and length than the loop and a central portion of the loop extending to below the surface of the plate, and a spring clip for insertion through the loop and engaging the plate under tension thereby holding the inturned edges of the cover member in contact with the opposite face of the plate under tension.

4. A composite metal molding for fastening to an apertured plate comprising a sheet metal base member of the desired form in cross section with the edges thereof lying in a plane at one side of the body portion thereof, loops struck out from the body of the base member to project beyond the plane of the said edges and through the apertures of the plate, an imperforate cover member of sheet metal secured to the base member, and a retaining clip of sheet metal of greater length than width, one end thereof being narrower than the opposite end and having notches in the opposite sides thereof intermediate the ends to engage the opposite sides of the respective loops, said retaining clip being bowed in form longitudinally and both said ends being reversely turned.

CLARENCE P. CHAMBERLIN.